United States Patent [19]

Raythatha et al.

[11] Patent Number: 4,818,294
[45] Date of Patent: Apr. 4, 1989

[54] KAOLINITE AGGREGATION USING ORGANO-SILICON COMPOUNDS

[75] Inventors: Rasik H. Raythatha, Tennille, Ga.; Joshua O. Brannen, III, Tyler, Tex.

[73] Assignee: E.C.C. America Inc., Atlanta, Ga.

[21] Appl. No.: 67,213

[22] Filed: Jun. 26, 1987

[51] Int. Cl.$^4$ .............................................. C04B 14/04
[52] U.S. Cl. ................... 106/487; 106/287.14; 106/287.16; 106/486
[58] Field of Search ............... 106/308 Q, 309, 287.14, 106/287.16, 483, 487, 416, 490, 486

[56] References Cited

U.S. PATENT DOCUMENTS

| | | | |
|---|---|---|---|
| 3,364,059 | 1/1968 | Marzocchi | 117/72 |
| 3,567,680 | 3/1971 | Iannicelli | 260/41.5 |
| 3,834,924 | 9/1974 | Grillo | 106/308 N |
| 3,894,882 | 7/1975 | Takewell et al. | 106/308 B |
| 4,381,948 | 5/1983 | McConnell et al. | 106/288 B |
| 4,704,416 | 11/1987 | Eck et al. | 106/287.12 |

OTHER PUBLICATIONS

Derwent Abstract Accession No. 70-10226R/07, Japanese Patent No. J70002915, Feb., 1970.
Derwent Abstract Accession No. 86-207431/32, Japanese Patent No. J61138708, Jun. 26, 1986.
Derwent Abstract Accession No. 87-010995/02, Japanese Patent No. J61268763, Nov. 28, 1986.

Primary Examiner—Amelia Burgess Yarbrough
Attorney, Agent, or Firm—Klauber & Jackson

[57] ABSTRACT

A particulate kaolin pigment which enhances gloss and printability properties when used as a coating pigment for paper and enhances light scattering and opacifying properties when incorporated as a filler in paper, is obtained by mixing a fine particle kaolin with an aggregating agent comprising an organic silicon compound such as tetramethoxy silane or tetraethoxy silane.

24 Claims, 9 Drawing Sheets

KAOLINITE AGGREGATION USING ORGANO-SILICON COMPOUNDS

FIELD OF THE INVENTION

This application relates to the preparation of chemically aggregated kaolinite using organo-silicon compounds. The products are useful as fillers and coatings for paper.

BACKGROUND OF THE INVENTION

Kaolinite based pigments are commonly used in paper industries for paper filing and paper coating applications. In general, the objectives of using the pigment are to improve appear qualities, such as opacity, brightness, smoothness, printing, porosity, surface coverage, light scatter, and to reduce the coast of paper manufacturing.

Both the brightness characteristics of the given kaolin and the opacifying properties of same when incorporated as a filler in paper, may be quantitatively related to a property of the filler identified as the "scattering coefficient S." The said parameter, i.e., the scattering coefficient S of a given filler pigment, is a property well-known and extensively utilized in the paper technology art, and has been the subject of numerous technical papers and the like. The early exposition of such measurements was made by Kubelka and Munk, and is reported in Z. Tech Physik 12:539 (1931). Further citations to the applicable measurement techniques and detailed definitions of the said scattering coefficient are set forth at numerous places in the patent and technical literature. Reference may usefully be had in this connection e.g., to U.S. Pat. Nos. 4,026,726 and 4,028,173. In addition to the citations set forth in these patents, reference may further be had to Pulp and Paper Science Technology Vol. 2 "Paper," Chapter 3, by H. C. Schwalbe (McGraw-Hill Book Company, N.Y.).

In a filled paper, higher light scattering is therefore important. Increased light scatter allows paper to look more opaque without increasing light absorption. The use of pigment with a higher light scattering coefficient allows reduction in either the basis weight or amount of filler required to achieve targeted properties, for example, opacity and brightness. Traditionally, this has been achieved using titanium dioxide, calcined clays and precipitated calcium carbonate. The relatively higher light scattering of titanium dioxide is due to higher refractive index. Higher light scatter observed with calcined kaolin and precipitated calcium carbonate is believed to be due to the intrinsic porous structure developed during the process of manufacturing of these pigments. See McConnell et al, U.S. Pat. No. 4,381,948.

In general, the attempt to increase light scatter by modification of kaolinite mineral also induces some increase in pore void volume. In addition, such modification can produce pigments with particle size distribution in a fairly narrow range. For example, calcining of fine kaolinite above its dehydroxylation point can produce a product with increased pore void volume. In U.S. Ser. No. 918,632 filed Oct. 14, 1986, similar aggregation is achieved chemically by reacted fine kaolinite clay with rapidly hydrolyzing metal chlorides. The acidic by-product of this reaction may be neutralized with gaseous ammonia. The light scattering coefficient and pore void volumes of these clays are significantly higher than the starting kaolinite material. Marginal increase in light scatter (generally less than 10 units) may be induced by mixing kaolinite particles of different size or by chemical flocculation. However, these structures are generally unstable and would break down under high shear stress of paper making or paper coating.

Aside from use as fillers, the aggregated pigments are used in paper coating to improve surface coverage. The application of such pigments can lead to a smoother surface, higher porosity, gloss and print properties. In the said patent application a chemically aggregated kaolin pigment is shown to significantly increase coated sheet properties, especially paper and print gloss.

In more detail, in U.S. Pat. No. 4,381,948 to A. D. McConnell et al, a calcined kaolin pigment is disclosed and a method for manufacture of same. The said pigment consists of porous aggregates of kaolin platelets, and exhibits exceptionally high light scattering characteristics when incorporated as a filler in paper. This pigment, which substantially corresponds to the commercially available product ALPHATEX® of the present assignee, E.C.C. America Inc. (Atlanta, Georgia), is prepared by first blunging and dispersing an appropriate crude kaolin to form an aqueous dispersion of same. The blunged and dispersed aqueous slurry is subjected to a particle size separation from which there is recovered a slurry of the clay, which includes a very fine particle size; e.g. substantially all particles can be smaller than 1 micrometer E.S.D. The slurry is dried to produce a relatively moisture-free clay, which is then thoroughly pulverized to break up agglomerates. This material is then used as a feed to a calciner; such feed is calcined under carefully controlled conditions to typical temperatures of at least 900° C. The resulting product is cooled and pulverized to provide a pigment of the porous high light scattering aggregates of kaolin platelets as described.

Calcined kaolin products, including those of the aforementioned ALPHATEX® type, are seen to be manufactured by relatively complex techniques involving a multiplicity of steps, including specifically a calcining step, plus various preparatory steps and post-calcining steps. Thus, the said product is relatively expensive to produce; and requires considerable investment in complex apparatus and the like—e.g. highly regulated calciners, etc. It can indeed be noted that the conditions of preparation of these materials must be very carefully controlled in order to keep abrasion acceptably low in the calcined product. For example, the calcination operations tends per se to produce an abrasive product—in consequence of overheating—if great care is not taken to preclude such a result.

It is further to be noted that in order to produce a low abrasion calcined product, the particle size in the feed to the calciner must be carefully controlled—even a relatively small increase in coarseness of such feed can have very marked detrimental effect on Valley abrasion.

In U.S. Ser. No. 918,632 filed Oct. 14, 1986, a process is disclosed in which a fine particle size kaolin is reacted in particulate form with a metal chloride, such as silicon tetrachloride, to form a chemically aggregated structured kaolin pigment. The metal chloride may be one or more of the chlorides having the general formula $MCl_x$, where M is Si, Ti or Al; and X is 3 or 4 depending on the valence of M. Heating may optionally be used to shorten the reaction time. When so used, temperatures generally will not, however, exceed about 150° C. In order to complete the polymerization and condensation which is though to occur, it is preferable to age the resulting product for a period, typically at least three days. In another aspect of that process, additional improvements in the products are found to occur by the addition of ammonia to the combined kaolin and metal chloride.

Thus said patent application describes methods of preparing chemically aggregated kaolinite mineral using very reactive metal chlorides such as silicon tetrachloride and titanium tetrachloride. The application of such reactive metal chloride leads to aggregated products that give enhanced optical and printability properties for both filled and coated papers. However, due to the nature of the aggregating chemical, very specialized equipment and processing steps are required. In addition, the resultant by-products are difficult to remove by ordinary methods. In this invention, similar aggregates may be produced by reaction with organo-silicon compounds that are non-corrosive and produce no solid by-products.

It is known from U.S. Pat. No. 3,567,680 to Joseph Iannicelli, assigned to J. M. Huber Corporation, issued March 2, 1971, that mercaptopropyl silanes having the formula:

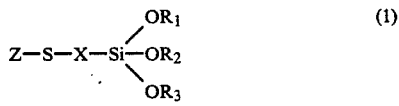

wherein Z is selected from the group consisting of hydrogen, cation, alkyl, aryl, alkylaryl, arylalkyl and derivatives thereof; X is selected from the group consisting of alkyl, alkylaryl, and arylalkyl; and $R_1$, $R_2$ and $R_3$ are selected from the group consisting of hydrogen, cation and alkyl, are suitable for modifying kaolin clays to enable them to be used as reinforcing fillers for elastomers. In fact the thus modified clays have been the candidates of choice for such fillers in commerce. It may be noted that in the Iannicelli disclosure, only the trialkoxy mercaptopropyl silanes are considered. Blends of these mercapto organosilanes with amino organosilanes are also disclosed.

In U.S. Pat. No. 3,364,059 to Marzocchi, a method for treating glass fibers to improve their bonding relationship to rubbers comprises treating them with a silane containing a thio group.

According to the present invention, the thio group and the amino group are not required. Sulfur-free and nitrogen-free organic silicon compounds are employed.

In U.S. Pat. No. 3,834,924 to Thomas G. Grillo, assigned to J. M. Huber Corporation, an amino organosilane is added to a high solids content pigment dispersion or slurry to change the slurry form into a thick, flocculated and plastic type that is suitable for extrusion and drying. Because a thick, cake-like product is formed, the amino organosilane and pigment dispersion are preferably mixed or blended directly in a solids mixing apparatus such as an extruder, designed to extrude the plastic mass in the form of a compacted rod type body which may be fed directly into a drier. The products are useful as a filler for polyurethanes. As can be seen, the described treatment is for the different purpose of forming a flocculated, plastic mass of the kaolin, not for the purpose of aggregating fine kaolin particles to form aggregated fine kaolin particles.

In U.S. Pat. No. 3,894,882 to Robert B. Takewell et al, assigned to J. M. Huber Corporation, a rotating pelletizing drum is used to form pellets from clay such as kaolin clay. To avoid the problem of dust, a wetting liquid is introduced into the drum, preferably steam or steam/water. The steam adds heat to the pellets to aid in drying them. There is an incidental mention of using "other suitable wetting liquids", an extensive list being given which includes silanes.

In accordance with the foregoing, it may be regarded as an object of the present invention to provide an aggregated kaolin pigment product which possesses improved pigment bulk, porosity and light scattering characteristics, and hence is useful as a bulking pigment for coating of paper and paper board, and which may also be used as an opacifier and light scattering filler for paper and paper board as well as in other paper manufacturing applications.

It is also an object of the invention to provide a pigment product of the foregoing character which is prepared without calcination and therefore without subjecting the kaolinite to high temperatures, and which accordingly possesses low abrasiveness in accordance with the kaolinite feed from which it is produced.

Another object of the present method is to demonstrate application of substantially dry kaolin pigment in aggregation.

Yet another object is to demonstrate aggregation of kaolinite particle by dry processing routes.

Yet another object is to demonstrate use of aggregated pigment made by the present invention in paper filling to enhance optical properties.

Yet another object is to show the application of such pigment in light weight coatings.

Yet another object is to show the production of the pigment in the presence of an aggregation enhancer such as calcium chloride.

It is a further object of the present invention to produce pigment that is free of soluble salts.

It is yet another object of the present invention to produce a pigment that, as a consequence of aggregation, can be processed to a slurry at a solids content higher than 60% by weight without unduly poor rheological consequences.

It is yet another object of the present invention to provide a process wherein aggregation efficiency, i.e. light scatter, is improved by application of gaseous ammonia.

It is an object of the present invention to produce aggregated kaolinite pigment with minimum steps in producing said pigment.

It is also an object of the present invention to produce aggregated kaolinite pigment at relatively low cost compared with available such products.

SUMMARY OF THE INVENTION

The present invention comprises a method of producing aggregated kaolin pigments, specifically structured kaolin pigments, using organo-silicon compounds either singly or in combination. In general, the compounds may be selected from the following:

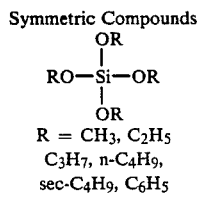

Symmetric Compounds

-continued

Asymmetric Compounds

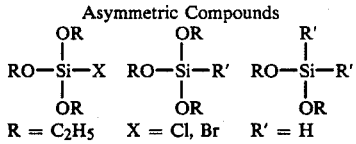

$R = C_2H_5 \quad X = Cl, Br \quad R' = H$

In a typical process, substantially dry kaolin mineral is treated with an effective amount of an organo-silicon compound such as silanes having the formula $(RO)_4Si$, where R is a lower alkyl group of 1 to 4 carbon atoms, e.g., methyl ($CH_3$), or ethyl ($CH_3CH_2$). The R groups in the silane can be the same or different. The resulting products exhibit increased light scatter, improved wet void volume and bulk. The aggregates seem to have a permanent structure that is strong enough to withstand the high shear forces of paper making and paper coating.

Aggregation enhancing chemicals, which may optionally be used, comprise alkaline earth metal chlorides and lithium chloride. Amounts used of this aggregation enhancing agent may be in the range of 0.05 to 3.0%, typically 0.05 to 2% by weight of the salt based on the weight of the dry kaolin.

Typically, feed moisture is in the range of 1 to 2%, preferaly 1.0 to 1.75% by weight of the feed clay. The most preferred range is 1.5 to 1.75% by weight of the clay.

The amount of organic silicon compound may range from 0.1 to 3.0%, preferably from 0.2 to 2.0% by weight of dry kaolin.

Figure 1:
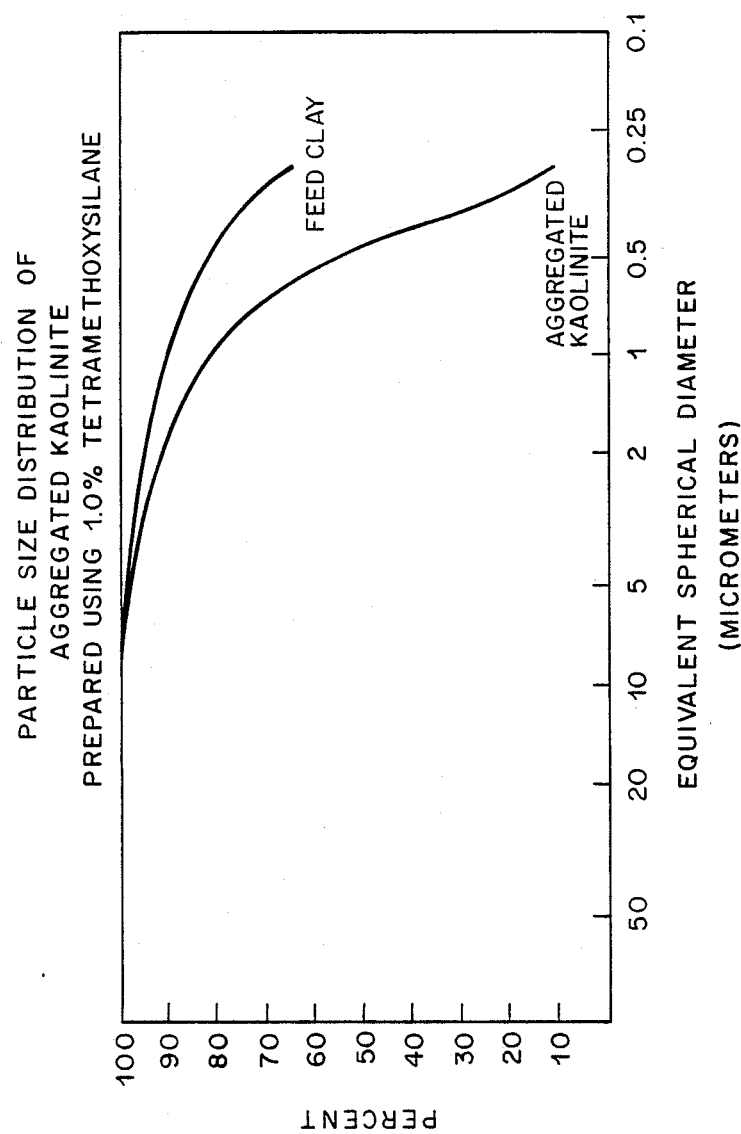
In FIG. 1 are compared the particle size distribution of the starting material and an aggregated product prepared using 1% tetramethoxysilane.
Figure 2:
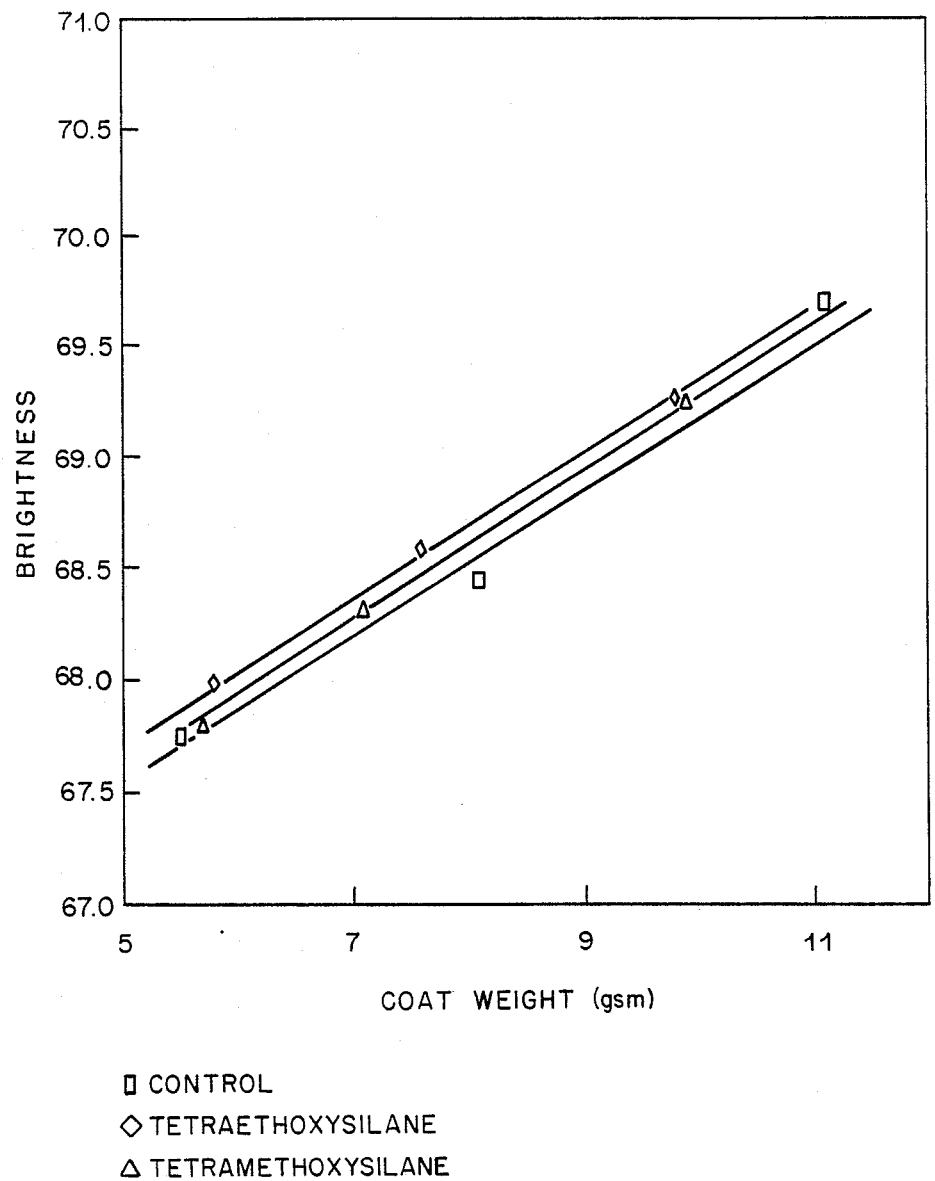
In FIG. 2 are plotted the brightness of coated sheets using aggregated pigments and a control consisting of fine clay and calcium carbonate.
Figure 3:
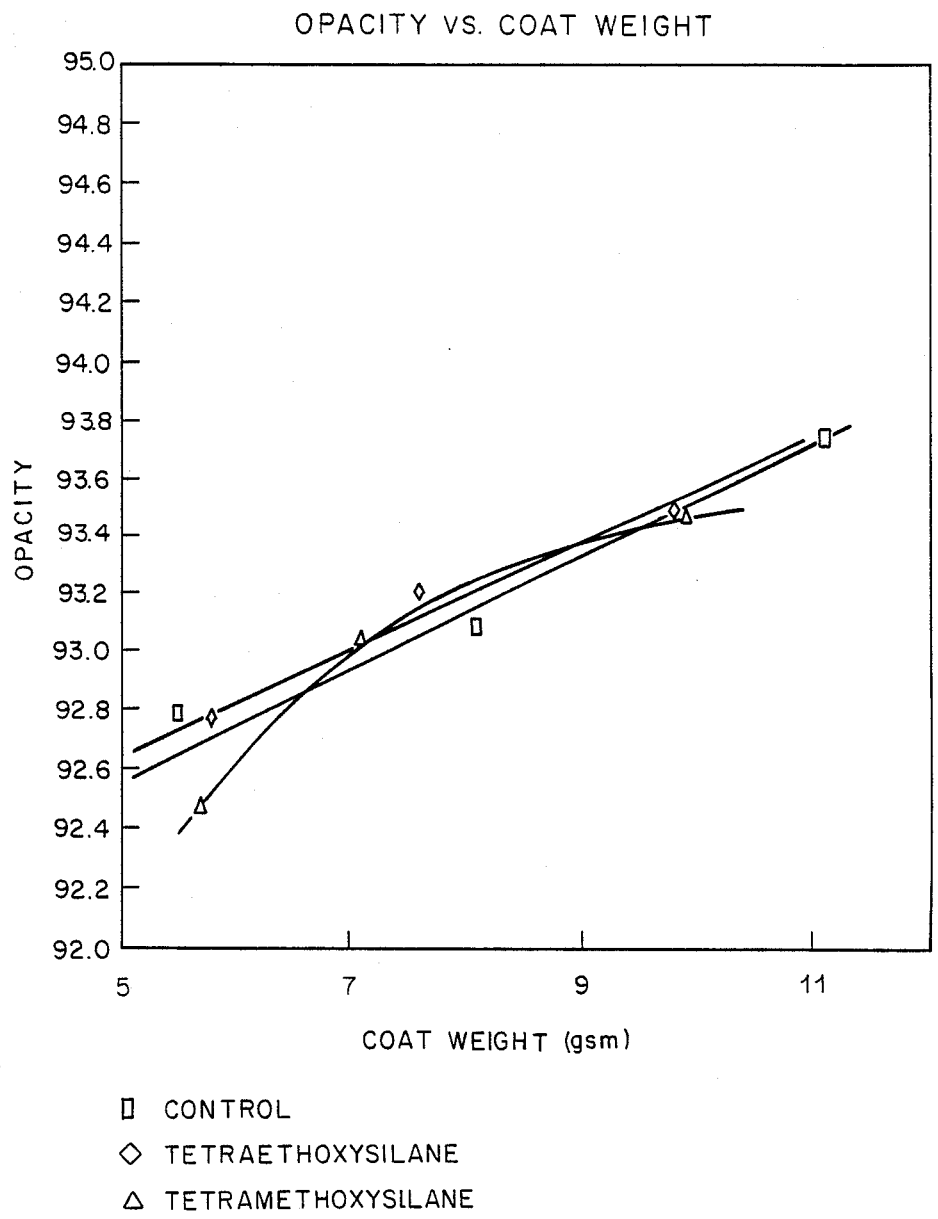
In FIG. 3 are plotted the opacity of coated sheets using aggregated pigments and a control consisting of fine clay and calcium carbonate.
Figure 4:
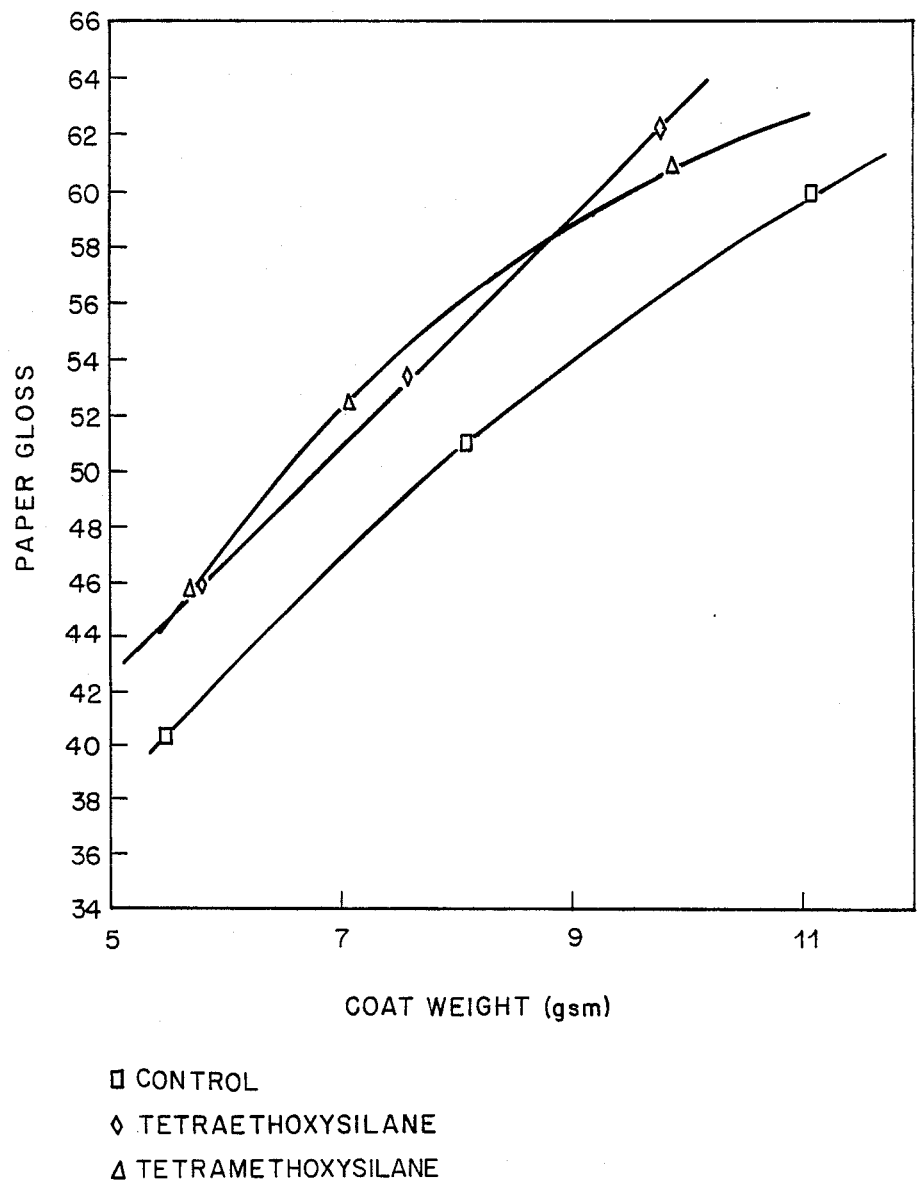
In FIG. 4 are plotted the paper gloss of coated sheets using aggregated pigments and a control consisting of fine clay and calcium carbonate.
Figure 5:
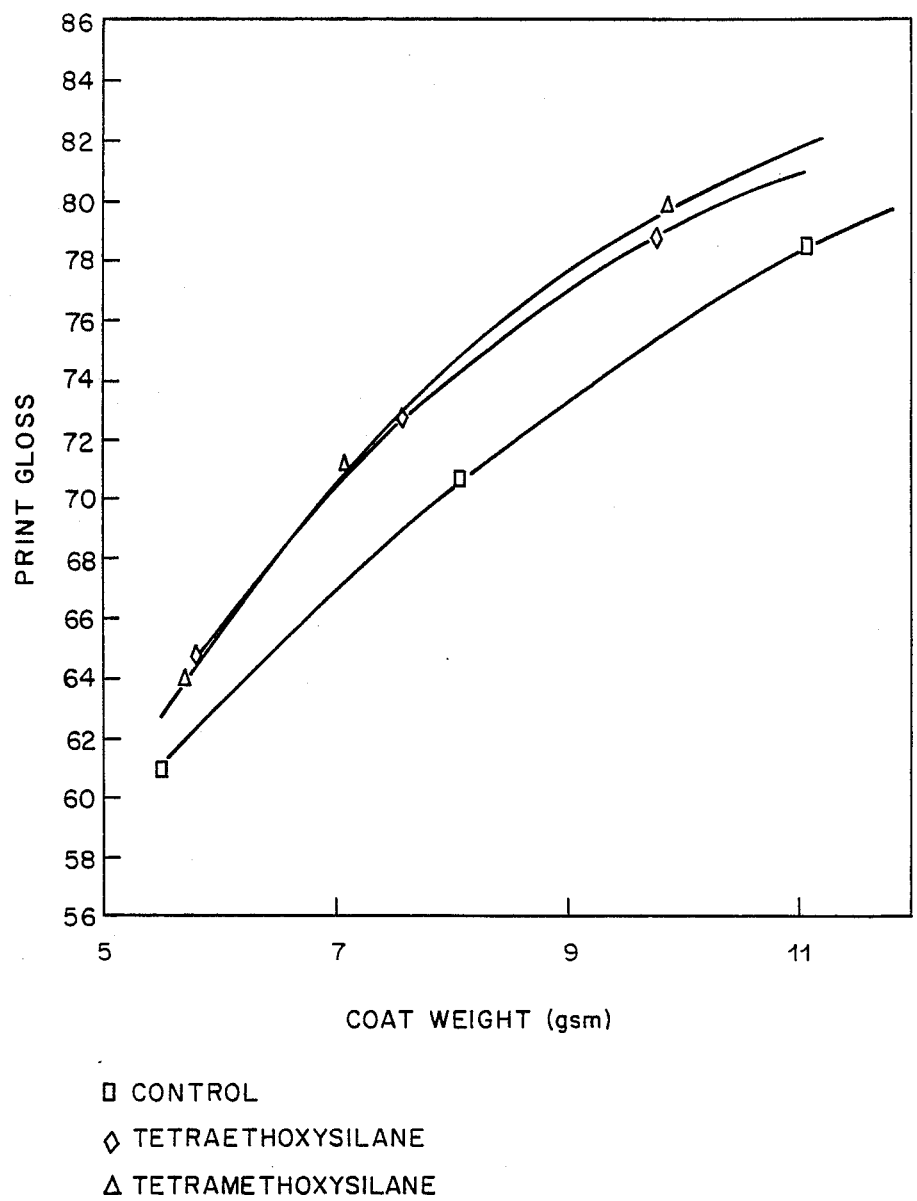
In FIG. 5 are plotted the print gloss of coated sheets using aggregated pigments and a control consisting of fine clay and calcium carbonate.
Figure 6:
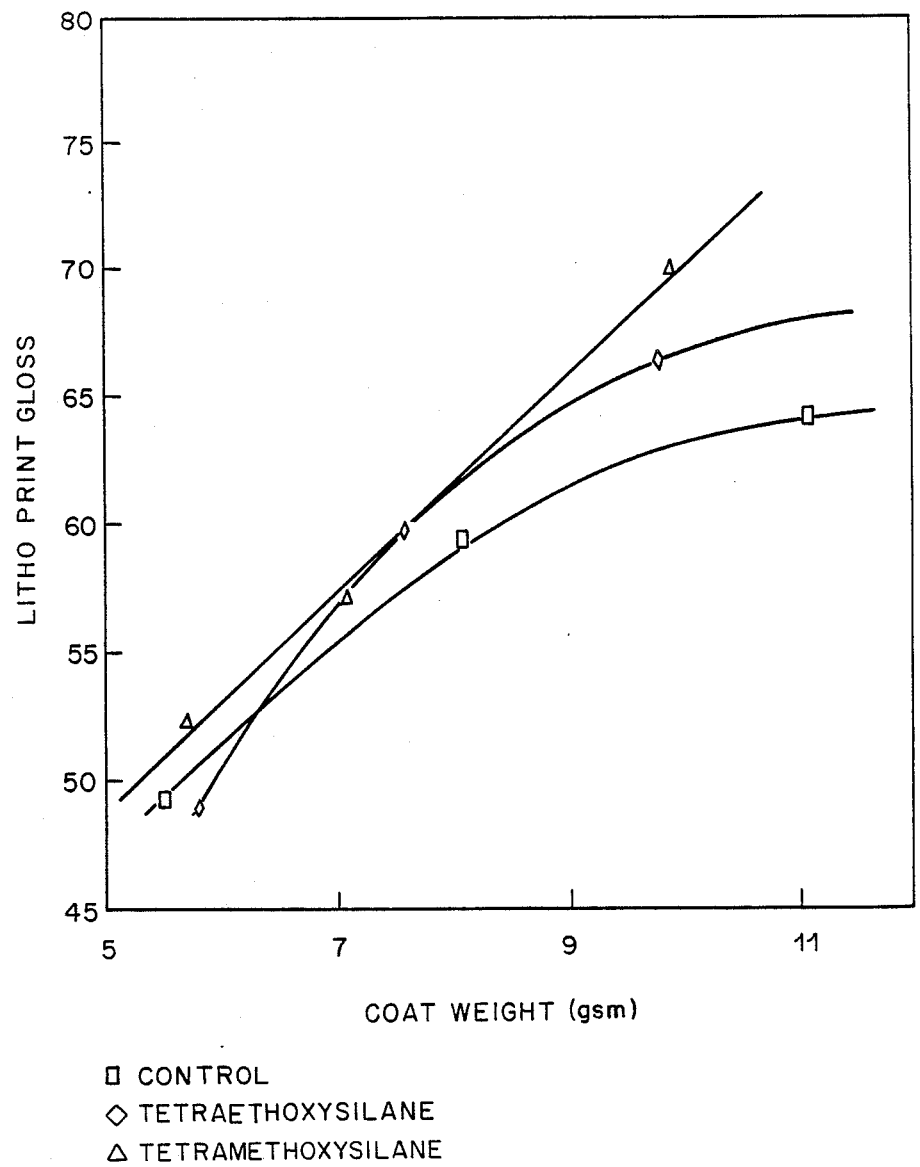
In FIG. 6 are plotted the litho print gloss of coated sheets using aggregated pigments and a control consisting of fine clay and calcium carbonate.
Figure 7:
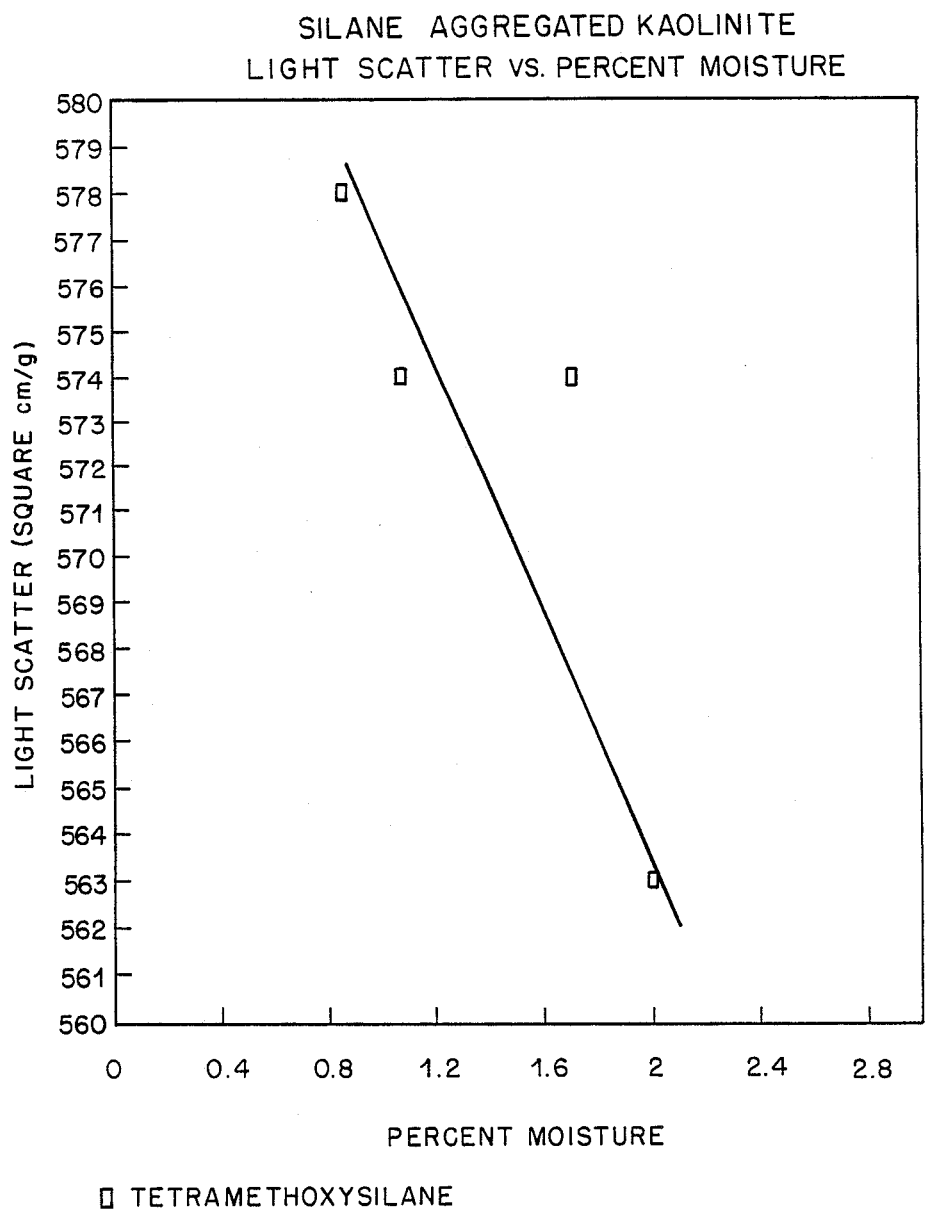
In FIG. 7 is plotted the effect of feed clay moisture on the light scattering characteristic of aggregated kaolinite prepared using 1% tetramethoxysilane.

In the ensuing description, all scattering data are normalized by comparison to the scattering coefficient of samples of the aforementioned Alphatex ®. Ideally in a study of the present nature, the same batch of beaten pulp should be used throughout. As this is not practical, the method adopted was to fill one set of sheets in each series of tests using the same Alphatex ® from series to series. Statistically, the Alphatex ® filled samples at 10% filler had a scattering coefficient of 680 cm2/gram, and in series in which Alphatex ® differed from 680, the scattering coefficients of the experimental samples were accordingly adjusted proportionally to the adjustments which the Alphatex ®-containing paper required to bring its value to 680 $cm^2$/gram. This procedure, which was used in subsequent examples, is from time to time referred to in the specification as "normalizing" the scattering coefficients.

DETAILED DESCRIPTION

General Methods of Preparation of Feed Clay

This corresponds to preparation of the commercial product Betagloss ® of the assignee E.C.C. America Inc. (Atlanta, Ga.).

The starting crude material was a blend of crude kaolins, which were derived from northeast Georgia, and which were comprised of very fine particle size materials. The GE brightness of the said crude was in the range of 82 to 87. In all instances in this specification it will be understood that brightness values are obtained according to the standard specification established by TAPPI procedure T-646 os-75.

The crude clays were beneficiated according to the general practice used in kaolinite processing industries. The beneficiated clays were classified by centrifugation to 94% less than 2 micrometer E.S.D. (equivalent spherical diameter). The classified clays were flocculated using 0.25% by weight of aluminum sulfate and adjusting the pH to 3.5 with sulfuric acid. The flocculated kaolinites were filtered. The significantly dried (about 20% moisture remains) kaolinites were redispersed with 0.25% by weight of sodium polyacrylate and the pH adjusted to about 7.0. The redispersed kaolinite was spray dried.

This method of preparing feed clays is general and may be varied, particularly if so pointed out in specific Examples; the main variations are differences in particle size distribution and the addition of calcium carbonate.

Standard Method of Relative Sedimentation Volume Measurement

The relative sedimentation volume of treated and starting material was measured to determine the extent and nature of aggregation. In the procedure, a nearly 55% solids slurry of pigment was prepared that contained 0.3 milliliter of sodium polyacrylate. This slurry was then spun at 7000 rpm for 45 minutes. The sediment volume was calculated using dry weight of clay, wet weight of clay, and calculating volume of clay using density of dry clay of 2.6g/ml.

The invention is demonstrated in the following examples which are intended to be illustrative but not limitative.

EXAMPLE 1

The starting feed clay was prepared from a blend of two fine Northeastern crude clays from Georgia. The crude clays were refined by common commercial beneficiation methods. The refined clay was classified to 96% less than 2 micrometer E.S.D. The classified clay was blended with ground calcium carbonate (Carbital —90) at 3% weight of dry kaolinite. The blend was spray dried and pulverized using a pulverizer manufactured by Mikropul Corporation. This clay will be referred to as Feed Clay-I.

75 g. of substantially dry powder, moisture 0.85%, of Feed Clay-I was treated with 1% by weight of tetramethoxysilane, supplied by Petrarch Chemical Co., with vigorous mixing in a Waring blender. Once the mixing of powder with liquid was completed, the clay was allowed to mix for an additional 1.5 minutes. Excess silane and resultant methanol as a by-product were removed by subjecting the clay to vacuum (nearly 30 torr). The above process with tetramethoxysilane was repeated once and the final product was allowed to dry at 150° C. for fifteen minutes.

The particle size distributions of the starting Feed Clay-I and the final product are illustrated in FIG. 1. The particle size distribution indicates formation of a structured aggregate with very narrow particle size distribution.

Handsheets were prepared using the above aggregated clay from bleached sulfite pulp. The sheets were filled at three filler loadings. The reflectivity of the handsheets was measured and converted to light scatter according to a modified Kabulka-Munk equation. The normalized light scatter of sheets field at 10% filler loading with this product was 578 $cm^2/g$. This is a gain of 60 scatter units from untreated Feed Clay-I. The intraparticle porosity of the pigment, given as percent wet void volume and determined by the relative sedimentation method (RSV) was 57.3%. This is an increase of about 17 percentage units from the feed clay. The increase in wet void volume indicates the formation of aggregate structure and development of the permanent porosity.

EXAMPLE 2

The process and the chemical used were essentially identical to Example 1, except that the feed was a fine commercial clay, Betagloss. The particle size distribution and moisture of this feed clay were 94% less than 2 micrometer, and 0.85% respectively. The normalized light scatter of a sheet filled with the final aggregated product, at 10% filler loading, was 562 $cm^2/g$. Wet void volume of the product determined by RSV was 56.4%, an increase of about 16% percentage units over the feed clay.

EXAMPLE 3

The feed clay, aggregating agent and the mixing process were essentially identical to that of Example 2, except that the clay was treated with 0.45% by weight of ammonia gas following each evacuation step. The normalized light scatter of a sheet filled with this pigment, at 10% filler loading, was 550 $cm^2/g$. The wet void volume of the product, determined by RSV, was 56.7%. Wet void volume and scatter respectively are about 16 percentage units and 30 scatter units higher than the feed clay.

EXAMPLE 4

In this example Feed Clay-II was prepared by mixing 3% ground calcium carbonate with previously spray dried and pulverized Betagloss followed by drying at 150° C. for 15 minutes. The moisture of this feed clay-II was 0.68% by weight. The aggregating chemical and the treatment process were essentially identical to Example 1. The normalized light scatter of a sheet filled with this pigment at 10% filler loading was 585 $cm^2/g$, which is an increase of about 65 units over the feed clay. Wet void volume is about 16 percentage units higher than the feed clay, thus 55.9%.

EXAMPLE 5

Feed Clay-II was treated by the essentially identical method and chemicals described in Example 3. The normalized light scatter of a sheet filled with this pigment at 10% filler loading was 588 $cm^2/g$. There was an about 16.1 percentage units increase in wet void volume over the feed clay following the chemical aggregation, thus 56.1%.

EXAMPLE 6

The feed clay and the process of treatment were essentially identical to the method described in Example 2, except that the aggregating agent was an organo-silicon compound containing ethoxy groups. $(CH_3CH_2O)_4Si$. The normalized light scatter of a sheet filled with this pigment at 10% filler loading was 547 $cm^2/g$. The wet void volume of the product by RSV was 54.1%. Upon chemical aggregation, wet void volume and light scatter increased by about 14 percentage units and 27 scatter units respectively over the feed clay.

EXAMPLE 7

The feed clay, aggregating agent, and the treatment process all were essentially identical to the method described in Example 6 except that the clay was exposed to 0.45% by weight of ammonia immediately following the evacuation step as described in Example 3. The normalized light scatter of a sheet filled with this pigment at 10% filler loading was 544 $cm^2/g$. The wet void volume determined by RSV of the product was 54.9%.

EXAMPLE 8

The feed clay and process were essentially identical to the method described in Example 4 except that the aggregating chemical was tetraethoxysilane, $(CH_3CH_2O)_4Si$. The normalized light scatter of a sheet filled with this pigment at 10% filler loading was 570 $cm^2/g$. The relative sedimentation method showed the product to have 52.1 percent wet void volume. The increases in light scatter and wet void volume amount to 50 scatter units and about 12 percentage units over the feed clay, respectively.

EXAMPLE 9

The process and aggregating chemical were essentially identical to the method described in Example 7 except that Feed Clay-II was the starting material. The normalized light scatter of a sheet filled with this structured aggregated clay, at 10% filler loading, was 584 $cm^2/g$. In addition, the wet void volume determined by RSV was 54.4%, an increase of about 14 percentage units over the feed clay.

EXAMPLE 10

The process, aggregating chemical and the feed clay all were essentially identical to the method described in Example 1, except that the moisture content of the feed clay was such that the molar ratio of water to silane was 4.69, which is equivalent to a moisture content of the feed clay of about 1.11% by weight. The relative sedimentation method showed the product to have 57.5 percent wet void volume.

This product was used to determine coated sheet properties of light weight coated offset grade paper. In the coating formulation, 30 parts of regular coating pigment were replaced with this product. The typical formulation and relevant formulation properties are provided in Table 1.

Almost all of the coated sheet properties improved by application of this aggregated clay, for example, sheet gloss, print gloss and opacity. These coated sheet properties are illustrated in FIGS. 2 through 6. The properties, i.e. brightness, opacity, gloss, print gloss, and litho print gloss are compared with a common offset control formulation.

EXAMPLE 11

The feed clay and the process were essentially identical to the method described in Example 10, except that the aggregating chemical was $(CH_3CH_2O)_4Si$, tetraethoxysilane. The relative sedimentation method showed the product to have 51.9 percent wet void volume, an improvement of nearly 12 percentage units over untreated feed clay.

As in Example 10, this pigment was evaluated in a paper coating application. Once again, significant improvement of coated sheet properties is observed with this aggregated structure pigment. The essential coated sheet properties, e.g. brightness, opacity, gloss, print gloss, and litho print gloss are illustrated in FIGS. 2 to 6.

EXAMPLE 12

It is postulated that the hydrolysis, and subsequent polymerization of the hydrolyzed products, of the organo-silicon compound, e.g. silane, would depend on the availability of free moisture. In the presence of excessive moisture it might be possible that the hydrolyzed product would precipitate as an amorphous silica. In this example, the effect of starting feed clay moisture on aggregation is examined. The feed clay, aggregating chemical and process all were identical to that of Example 1, except that the moisture of the feed clay was varied in the range of 1 to 2 % by weight, so that the effective ratios of total water to the amount of silane were in the range of 4.56 to 8.44. The light scatter values of the handsheets prepared using respective aggregated clays, at 10% filler loading, are provided in Table 2. This relationship between moisture and light scatter is graphically illustrated in FIG. 70. The effective aggregation can be achieved even at a water to silane ratio of 8.44. The preferred range of moisture appears to be between 1.0 to 1.75% by weight of dry clay.

EXAMPLE 13

The feed clay, aggregating chemical and part of the processing were identical to Example 12, the moisture of the feed clay being 1.08% by weight, except that in the process there was a time delay of 10 minutes prior to the repeat chemical treatment. The light scatter of a sheet filled with this product at 10% filler loading was 582 cm²/g. Apparently higher residence time is beneficial for developing a more effectively structured aggregate.

EXAMPLE 14

The starting material was a Feed Clay-I that contained 3% ground calcium carbonate, Carbital-90. The moisture of the feed clay was adjusted to 3.29% by weight. 75 grams of this feed clay was treated with 1% by weight of tetraethoxysilane, $(CH_3CH_2O)_4Si$, by the usual method of mixing, using a commercial Waring blender. After addition of the silane, mixing was continued for 1.5 minutes. The clay was then subjected to vacuum for about two minutes and the whole process was repeated once. The final product was dried at 150° C. for 15 minutes. The wet void volume of the final product, as determined by RSV method, was 51.2%, an increase of about 11 percentage units over the starting feed clay.

EXAMPLE 15

In this example, moisture of the Feed Clay-I was adjusted to 2.94% by weight and the clay was treated with 0.5% by weight of tetraethoxysilane, $(CH_3CH_2O)_4Si$. The rest of the treatment process was identical to that of Example 14. Wet void volume of this product was 46.2%, about 6 percentage units higher than the feed clay.

EXAMPLE 16

The feed clay, feed clay moisture, aggregating chemical and the treatment process all were identical to those described in Example 15, except that the amount of the aggregating agent was 0.25% by weight of the clay. The wet void volume of this product was 47.1%, an increase of about 7 percentage units over the feed clay.

EXAMPLE 17

Figure 8:
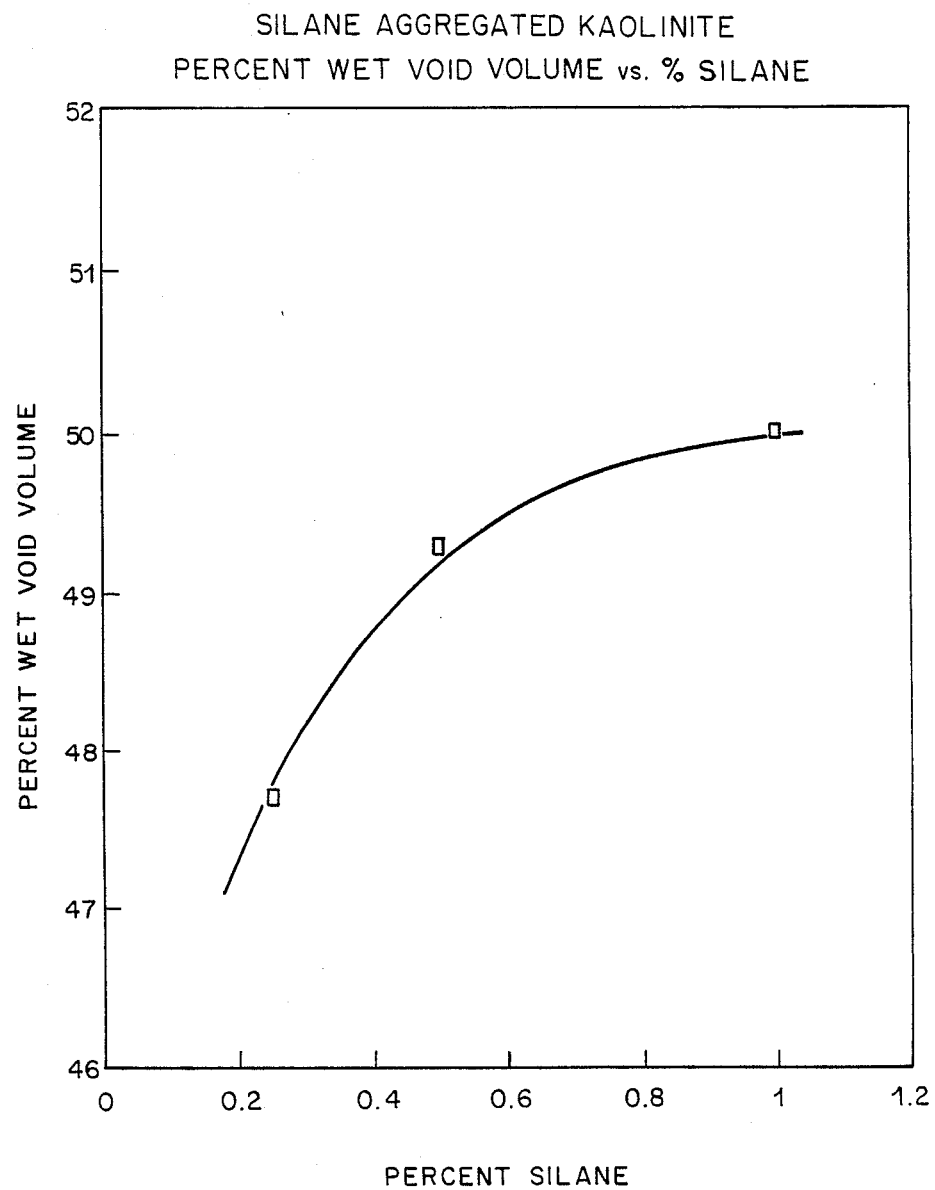
In FIG. 8 are plotted the percent wet void volume of aggregated pigments vs. amounts of the aggregating agent.
Figure 9:
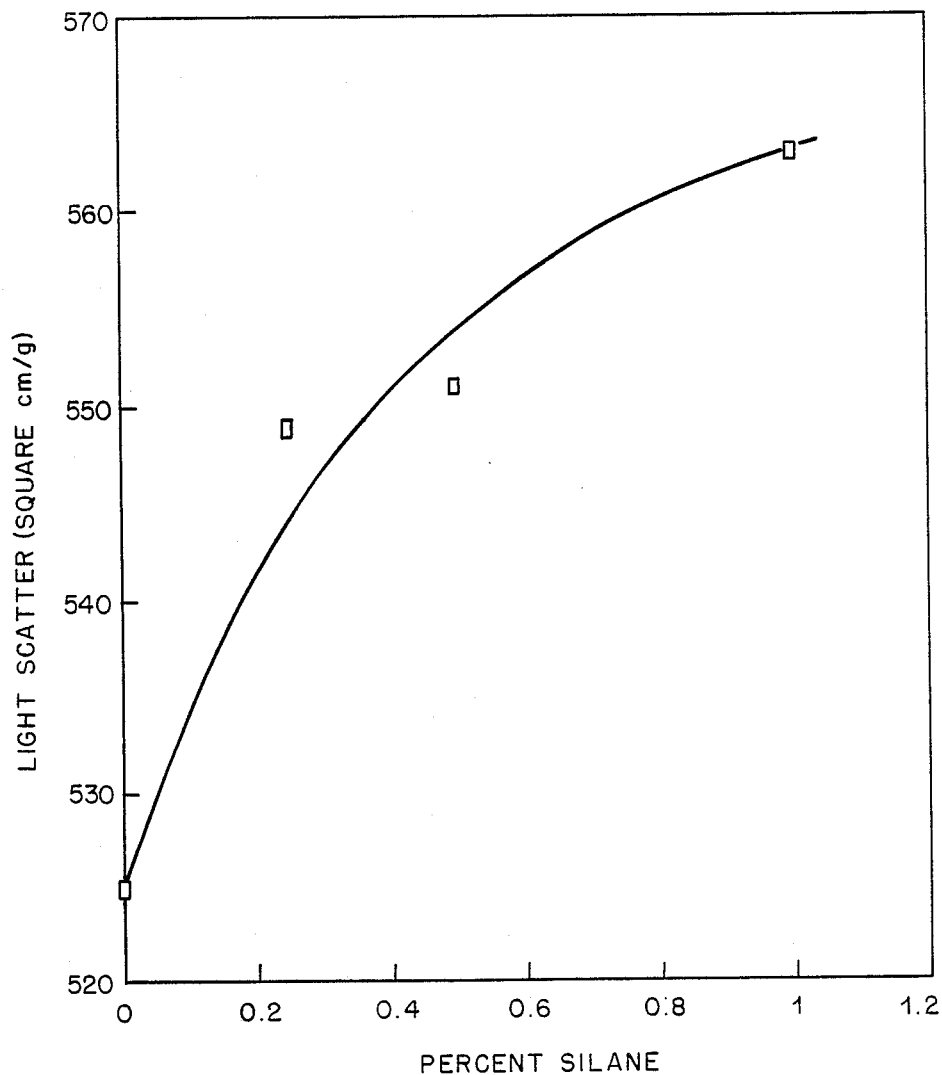
In FIG. 9 are plotted the light scatter of aggregated pigment vs. amounts of aggregating agent.

This example demonstrates the relation between the amount of aggregating agent vs. aggregate performance by keeping all other conditions the same. The starting material was a Feed Clay-I in which the moisture was adjusted to 0.95% by weight. This feed clay was treated separately using 0.25%, 0.5% and 1.0% by weight of tetraethoxysilane, $(CH_3CH_2O)_4Si$, according to the process described in Example 14. The normalized light scatter of a sheet filled with these pigments at 10% filler loadings and percent wet void volumes of these aggregated fillers are provided in Table 3. Also, the relation between the amount of aggregating agents vs. wet void volume and light scatter of filled sheets are illustrated in FIGS. 8 and 9 respectively. It is evident that the silane enhances these properties.

EXAMPLE 18

This example further demonstrates the relation between the amount of aggregating agent vs. aggregate performance by keeping all other conditions the same. The starting material was a Feed Clay-I where the moisture was adjusted close to 1.72% by weight. This feed clay was treated separately using 0.25% and 0.5% by weight of tetraethoxysilane, $(CH_3CH_2O)_4Si$ according to the process described in Example 17. The normalized light scatter of a sheet filled with these pigments at 10% filler loadings and percent wet void volumes of these aggregated fillers are provided in Table 4.

EXAMPLE 19

This example describes use of an aggregation enhancing agent, calcium chloride. In the process, Feed Clay-I was mixed with 0.5% by weight of dihydrated calcium chloride salt and the feed moisture was adjusted to 1.64% by weight of the clay. The chemical treatment process was identical to that of Example 17. 1.0% by weight of tetraethoxysilane was used. The normalized light scatter of a sheet filled with this pigment at 10% filler loading was 577 cm²/g. The resulting product is more porous as indicated by the substantially higher wet void volume, 61.6% measured by RSV technique.

EXAMPLE 20

In this example, the effect of amount of aggregation enhancing agent is examined. The feed clay and the chemical treatment were identical to those described in Example 19, except that in a first set, feed clay was separately dosed with 0.2, 0.5 and 1.0% by weight of calcium chloride. In each case moisture of the feed clay was adjusted to nearly 1.3% by weight, after mixing Feed Clay-I with calcium chloride. Similarly, in a second set, feed clay was separately dosed with 0.05 and 0.1% by weight of calcium chloride except that the moisture of the feed clay was adjusted to 1.9% by weight. Each of these clays was treated with 0.5% by weight of tetraethoxysilane. The final products are porous aggregates as seen from wet void volume, measured by RSV technique. The wet void volumes are provided in Table 5.

EXAMPLE 21

Previous examples have demonstrated that the use of tetramethoxysilane produced more efficient aggregates; however, tetraethoxysilane is more cost effective. Thus, to produce efficient, but cost effective aggregates, a combination of tetraethoxy- and tetramethoxy- silane was used in this example. The feed clay was identical to the one described in Example 14. The moisture of the feed clay was adjusted to 0.85% by weight. The chemical treatment process was essentially identical to the method described in Example 14 except that the composition of the aggregating agents consisted of 0.25% by weight of tetraethoxysilane and 0.05% by weight tetramethoxysilane. The wet void volume of the final product, determined by RSV technique, was 51.4%. This is an increase of nearly 11 percentage units over the feed clay. The overall amount of chemical required is significantly lower than that required for similar aggregation using either tetraethoxy- or tetramethoxy-silane alone.

EXAMPLE 22

The starting material for this experiment was a commercial coating clay Betagloss. This clay, after initial beneficiation, size classification, filtration and redispersion was diluted to 40% by weight slurry. This slurry was spray dried and pulverized using a pulverizer produced by Mikropul Corporation. The particle size distribution of this clay was 94% less than 2 micrometer E.S.D. The moisture of this clay was adjusted to 0.86% by weight. 75g. of this clay was treated with 0.25% by weight of tetraethoxysilane, $(CH_3CH_2O)_4Si$, using a commercial mixer, a Waring blender. The wet void volume determined by relative sedimentation method was 57.3%. This is a substantial increase over feed clay wet void volume of 40%.

EXAMPLE 23

The feed clay, treatment process, aggregating chemical and amount of the tetraethoxysilane were identical to that in Example 22 except that the feed clay was dosed with 0.1% by weight of an aggregation enhancing chemical, calcium chloride, and the moisture of the feed was adjusted to 0.98% by weight. The percent wet void volume of the product was 50.4%, an increase of about 10 percentage units over the feed clay.

EXAMPLE 24

Feet Clay-I was equilibrated with moist air to increase moisture of the feed clay from 0.85% to 1.5% by weight of the clay. This clay was treated with 0.5% by weight of tetraethoxysilane, $(CH_3CH_2O)_4Si$, under vigorous mixing conditions using a commercial mixer, a Waring blender. After the treatment with tetraethoxysilane, mixing was continued for an additional 1.5 minutes. This product was dried at 150° C. for 15 minutes. Wet void volume of this product was 50.5% by weight.

EXAMPLE 25

The feed clay and chemical were identical to that described in Example 24. This time the feed clay was mixed with 0.5% by weight of an aggregation enhancing agent, calcium chloride and the moisture of the feed clay was adjusted to 1.8% by weight of the clay. 75g. of this clay was treated with 0.5% by weight of tetraethoxysilane, $(CH_3CH_2O)_4Si$, in a Waring blender. After the addition of the silane, mixing was continued for 1.5 minutes. The clay was then subjected to vacuum for about two minutes. The above process with tetraethoxysilane was repeated once. The final product was dried at 150° C. for 15 minutes. The wet void volume of the final product was 50.1%, about 10 percentage units higher than the feed clay.

EXAMPLE 26

A series of experiments was conducted using Feed Clay-I as a starting material. The moisture of the feed clay was adjusted to 1.0% by weight. Three separate portions, 75g each, were treated with 0.25% by weight of tetraethoxysilane, $(CH_3CH_2O)_4Si$, according to Example 13, except that the time between each chemical treatment was increased to 15, 30 and 60 minutes. The normalized light scatter of handsheets filled with these pigments at 10% loadings is given in Table 6. In addition, the particle porosity measured as wet void volume is included in Table 6. In each case the light scatter and wet void volume improved significantly from the starting material.

TABLE 1

| Formulation Components | Formulations and Coating Formulation Properties | | |
|---|---|---|---|
| | Control | Pigment A* 30 parts | Pigment B** 30 parts |
| #1 Clay | 75 parts | 60 parts | 60 parts |
| Calcium Carbonate | 25 parts | 10 parts | 10 parts |
| Latex | 10 parts | 10 parts | 10 parts |
| Starch | 4 parts | 4 parts | 4 parts |
| Nopcote C-104 | 0.5 part | 0.5 part | 0.5 part |
| Sunrez 700 M | 0.12 part | 0.12 part | 0.12 part |
| Dispex N-40 | 0.1 part | 0.1 part | 0.1 part |
| pH | 7.6 | 8.0 | 8.1 |
| % Solids | 64.1 | 63.9 | 63.8 |
| Brookfield Viscosity 100 rpm (cps) | 880 | 1080 | 1040 |

*Prepared by using Tetramethoxysilane
**Prepared by using Tetraethoxysilane

TABLE 2

Effect of Feed Clay Moisture on
Light Scatter of Handsheets Filled With
10% Chemically Aggregated Kaolinite Pigment

| Percent Moisture | Water/Silane Moles/Moles | Normalized Light Scatter at 10% Filler Loading |
|---|---|---|
| 2.0 | 8.44 | 563 |
| 1.71 | 7.22 | 574 |
| 1.08 | 4.56 | 574 |

TABLE 3

Effect of Silane Concentration on the
Properties of Aggregated Kaolinites
Prepared Using Tetraethoxysilane

| Percent Chemical | Molar Ratio of Water to Silane | Normalized Light Scatter at 10% Filler Loading | Percent Wet Void Volume |
|---|---|---|---|
| 0.25 | 21.96 | 549 | 47.7 |
| 0.5 | 10.98 | 551 | 49.3 |
| 1.0 | 5.48 | 563 | 50.0 |

TABLE 4

Effect of Silane Concentration on the
Properties of Aggregated Kaolinites
Prepared Using Tetraethoxysilane

| Percent Chemical | Molar Ratio of Water to Silane | Normalized Light Scatter at 10% Filler Loading | Percent Wet Void Volume |
|---|---|---|---|
| 0.25 | 39.76 | 562 | 48.9 |
| 0.5 | 20.10 | 564 | 50.2 |

TABLE 5

Effect of Calcium Chloride on Wet Void
Volume of Chemically Aggregated Kaolinites

| Amount of Calcium Chloride (% by weight) | Feed Clay Moisture (% by weight) | Percent Wet Void Volume* |
|---|---|---|
| 0.05 | 1.9 | 51.1 |
| 0.1 | 1.9 | 51.1 |
| 0.2 | 1.3 | 53.0 |
| 0.5 | 1.3 | 62.5 |
| 1.0 | 1.3 | 62.9 |

*The wet void volume of the feed clay was 40.2.

TABLE 6

Effect of Time Delay Between Chemical
Treatment Steps in the Aggregation of
Kaolinite Using 0.25% Tetramethoxysilane.

| Delay Time (Minutes) | Normalized Light Scatter at 10% Filler Loading | Percent Wet Void Volume |
|---|---|---|
| 15 | 542 | 52.2 |
| 30 | 546 | 55.6 |
| 60 | 544 | 52.0 |

When used in paper coating applications, the structured kaolin pigments of the invention comprise from about 5 to 60% and preferably from about 10 to 30% by weight of the total pigment component of the coating composition. The balance of the pigment can comprise any of the known coating pigments, such as coating grades of kaolines, calcium carbonate, titanium dioxide, plastic pigments, etc. The coating compositions, in addition to the pigment component, include conventional components, such as an adhesive binder, dispersants, and other known additives.

While this invention has been particularly set forth in terms of specifics, it is understood in view of this disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for producing a kaolin pigment providing enhanced optical and printability properties when used in paper manufacture, which comprises mixing kaolin particles having a moisture content in the range of 1 to 2% by weight with an aggregating agent comprising an organic silicon compound selected from the group consisting of symmetric compounds having the formula

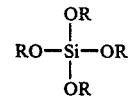

where R=$CH_3$, $C_2H_5$, $C_3H_7$, n—$C_4H_9$, sec-$C_4H_9$ and $C_6H_5$ and asymmetric compounds having the formula

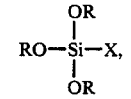

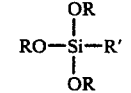

and

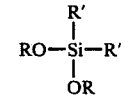

where R=$C_2H_5$, X=Cl or Br, and R'=H, ,and recovering an aggregated particular kaolin pigment product.

2. The method according to claim 1 in which the feed moisture content is in the range of 1.0 to 1.75% by weight.

3. The method according to claim 1 in which the feed moisture content is in the range of 1.5 to 1.75% by weight.

4. The method according to claim 1 in which the organic silicon compound comprises four hydrolyzable groups linked to silicon.

5. The method according to claim 1 in which the organic silicon compound is hydrolyzable to give liquid byproducts.

6. The method according to claim 1 in which the organic silicon compound is a silane having the formula $(RO)_4Si$ in which R is an alkyl group.

7. The method according to claim 6 in which R is an alkyl group of 1 to 4 carbon atoms and the R groups in the silane can be the same or different.

8. The method according to claim 7 in which the silane is selected from the group consisting of tetramethoxysilane and tetraethoxysilane and mixtures thereof.

9. The method according to claim 1 in which the kaolin particles are additionally mixed with an aggregation enhancing agent selected from the group consisting of alkaline earth metal salts and lithium chloride.

10. The method according to claim 9 in which the aggregation enhancing agent comprises a soluble salt of an alkaline earth metal ion.

11. The method according to claim 10 in which the aggregation enhancing agent comprises calcium chloride.

12. The method according to claim 1 in which the treatment with the organic silicon compound is repeated.

13. The method according to claim 1 in which the product is dried to shorten the time required for aggregation.

14. The method according to claim 1 in which the amount of the organic silicon compound is in the range of 0.1 to 3.0% by weight of the kaolin on a dry basis.

15. The method according to claim 14 in which the amount of the organic silicon compound is in the range of 0.2 to 2.0% by weight of the kaolin on a dry basis.

16. The method according to claim 13 in which the amount of the aggregation enhancing agent is in the range of 0.05% to 3.0% by weight of the kaolin on a dry basis.

17. The method according to claim 1 in which the treated kaolin is further treated by being exposed to ammonia.

18. The method according to claim 1 in which the feed kaolin comprises an air classified fine kaolin in which 80% of the particles are finer than 2 micrometers E.S.D.

19. The method according to claim 1 in which 96% of the feed kaolin particles are finer than 2 micrometers E.S.D.

20. The method according to claim 1 in which the kaolin particles are mixed with calcium carbonate.

21. The method according to claim 1 in which the feed kaolin moisture content is such that the molar ratio of water to aggregating agent is in the range of 2 to 50.

22. The method according to claim 21 in which the range is 4 to 20.

23. An aggregated particular kaolin pigment useful in paper coating and as a filler for paper which comprises kaolin particles that have been mixed with an organic silicon compound selected from the group consisting of symmetric compounds having the formula

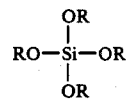

where $R = CH_3$, $C_2H_5$, $C_3H_7$, n—$C_4H_9$, sec-$C_4H_9$ and $C_6H_5$ and asymmetric compounds having the formula

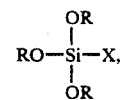

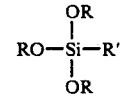

and

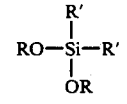

where $R = C_2H_5$, $X = Cl$ or $Br$, and $R' = H$.

24. A pigment according to claim 23 in which the organic silicon compound has the formula $(RO)_4Si$ in which R is an alkyl group of 1 to 4 carbon atoms and the R groups may be the same or different.

* * * * *